US011840463B2

(12) United States Patent
Qian et al.

(10) Patent No.: US 11,840,463 B2
(45) Date of Patent: Dec. 12, 2023

(54) DEVICE AND METHOD FOR ADVANCED WATER TREATMENT

(71) Applicant: SUZHOU UNIVERSITY OF SCIENCE AND TECHNOLOGY, Jiangsu (CN)

(72) Inventors: Feiyue Qian, Jiangsu (CN); Shiqian Gao, Jiangsu (CN); Junxia Wang, Jiangsu (CN)

(73) Assignee: SUZHOU UNIVERSITY OF SCIENCE AND TECHNOLOGY, Jiangsu (CN)

(*) Notice: Subject to any disclaimer, the term of this patent is extended or adjusted under 35 U.S.C. 154(b) by 169 days.

(21) Appl. No.: 17/041,421

(22) PCT Filed: Aug. 1, 2019

(86) PCT No.: PCT/CN2019/098806
§ 371 (c)(1),
(2) Date: Sep. 24, 2020

(87) PCT Pub. No.: WO2020/052361
PCT Pub. Date: Mar. 19, 2020

(65) Prior Publication Data
US 2021/0039968 A1 Feb. 11, 2021

(30) Foreign Application Priority Data

Sep. 11, 2018 (CN) .......................... 201811057301.2
Sep. 11, 2018 (CN) .......................... 201811057303.1

(51) Int. Cl.
C02F 1/44 (2023.01)
C02F 101/20 (2006.01)
C02F 101/30 (2006.01)

(52) U.S. Cl.
CPC .............. *C02F 1/441* (2013.01); *C02F 1/442* (2013.01); *C02F 2101/20* (2013.01);
(Continued)

(58) Field of Classification Search
CPC ...... C02F 1/441; C02F 1/442; C02F 2101/30; C02F 2209/06; C02F 2303/16;
(Continued)

(56) References Cited

U.S. PATENT DOCUMENTS

2010/0032387 A1* 2/2010 Yokoi ..................... A61L 2/186
210/797
2010/0096317 A1* 4/2010 Morita ................. B01D 63/082
210/321.84
(Continued)

FOREIGN PATENT DOCUMENTS

| CN | 102086075 A | 6/2011 |
|---|---|---|
| CN | 104941466 A | 9/2015 |

(Continued)

OTHER PUBLICATIONS

Royal Society of Chemistry (Year: 2014).*
(Continued)

*Primary Examiner* — Patrick Orme
(74) *Attorney, Agent, or Firm* — Schmeiser, Olsen & Watts, LLP

(57) ABSTRACT

Disclosed are a device and a method for advanced water treatment, and the device comprises a plate-and-frame membrane reactor having a water inlet pipe and a water outlet pipe, a raw water delivery system communicating with the water inlet pipe of the plate-and-frame membrane reactor, and a clear water reservoir communicating with the water outlet pipe of the plate-and-frame membrane reactor; the advanced water treatment device further comprises an oxidant dosing system communicating with the water inlet pipe
(Continued)

of the plate-and-frame membrane reactor or the raw water delivery system, the plate-and-frame membrane reactor further comprises a carbon nano-material composite membrane, the carbon nano-material composite membrane comprises carbon nano-material layers sequentially disposed between the water inlet pipe and the water outlet pipe, and a base membrane layer supporting the carbon nano-material layers, and the raw material of the carbon nano-material layers comprises mono-layer reduced graphene oxide and multiwalled carbon nanotubes.

9 Claims, 7 Drawing Sheets

(52) U.S. Cl.
CPC ...... *C02F 2101/30* (2013.01); *C02F 2209/06* (2013.01); *C02F 2303/16* (2013.01)

(58) Field of Classification Search
CPC ........ C02F 1/725; C02F 1/78; C02F 2101/20; C02F 2305/08; B01D 63/082
See application file for complete search history.

(56) References Cited

U.S. PATENT DOCUMENTS

2011/0259747 A1* 10/2011 Cui .................... C02F 1/46109
204/674
2016/0301084 A1* 10/2016 Gendel ............... H01M 4/9083

FOREIGN PATENT DOCUMENTS

| CN | 105174611 A | 12/2015 |
| CN | 105521765 A | 4/2016 |
| CN | 106031847 A | 10/2016 |
| CN | 106283851 A | 1/2017 |
| CN | 106830168 A8 | 6/2017 |
| CN | 107537322 A | 1/2018 |
| CN | 109052728 B | 7/2019 |
| CN | 109095565 B | 7/2019 |
| GB | 603443 | 6/1948 |
| KR | 1020140085869 | 7/2014 |
| KR | 101437592 | 8/2014 |

OTHER PUBLICATIONS

Doran, "Unit Operations," Bioprocess Eng'g Principles, 2d (Year: 2013).*
Chen, et al., "A reduced graphene oxide nanofiltration membrane intercalated by well-dispersed carbon nanotubes for drinking water purification" and Electronic Supplementary Information, Nanoscale, 2016, 8, 5696-5705 (Year: 2016).*
International Search Report issued in International Application No. PCT/CN2019/098806, dated Oct. 29, 2019, pp. 1-3, China National Intellectual Property Administration, Beijing, China.
Written Opinion issued in International Application No. PCT/CN2019/098806, dated Oct. 29, 2019, pp. 1-5, China National Intellectual Property Administration, Beijing, China.
Chinese Journal of Applied Chemistry, vol. 31, Iss. 8, Aug. 2014, pp. 1-7.
Wen et al., P., "Advances in Composite Membrane Modified by Graphene Oxide and Multi-walled Carbon Nanotubes," Guangzhou Chemical Industry, vol. 43, No. 23, Dec. 2015, pp. 1-4.

* cited by examiner

DEVICE AND METHOD FOR ADVANCED WATER TREATMENT

RELATED APPLICATION

The present application is a U.S. National Phase of International Application Number PCT/CN2019/098806, filed Aug. 1, 2019, which claims priority to Chinese Application No. CN201811057303.1, filed Sep. 11, 2018, and Chinese Application No. CN201811057301.2, filed Sep. 11, 2018.

TECHNICAL FIELD OF THE INVENTION

The present disclosure belongs to the environmental protection technology field, specifically relates to a device and method for advanced water treatment.

BACKGROUND OF THE INVENTION

With heavy use of artificially synthesized chemicals (such as drugs, personal care products, cleansers, pesticides, and the like), a part of them is discharged into natural water through drainage systems in cities and towns, which brings potential ecology and environment risks. Such pollutants generally have characteristics such as low concentration (<1 mg/L), small molecular weight (<500 Dalton), hight solubility, and strong persistence, are also called micro-pollutants. Researches show that, traditional water treatment techniques, such as coagulation, precipitation, filtration, and biodegradation, have a low removal efficiency on micro-pollutants, which cannot meet the requirement of advanced purification of drinking water. At present, the membrane separation technique and advanced oxidation process are considered as effective means for controlling organic micro-pollutants.

By means of effects such as steric effect, electrostatic repulsion, dissolution and diffusion, membrane separation techniques represented by nano-filtration (NF) and reverse osmosis (RO) can effectively retain all kinds of pollutants of water, which has advantages of simple and fast operation, wide target applicability, and ease of automation of devices, however, the transmembrane pressure needs to be controlled at 10-20 bar for NF and 20-100 bar for RO, the energy consumption for processing an unit of water is high, the water production rate is generally lower than 75%, and the concentrated water still requires follow-up processing. In addition, due to that it is a pure physical separation process, the pollutants adhere to the membrane surface and within the pores to cause membrane fouling, which will result in significantly reduction in the water production performance of the system, even with back washing and chemical cleaning, it can only be partially restored. By contrast, the advanced oxidation process, such as UV-light or visible light catalytic oxidation, catalytic ozonation, persulphate catalytic oxidation, and Fenton reaction, decomposes or mineralizes the pollutants mainly by generating a certain amount of strong oxidizing free radicals such as OH and $SO_4 \cdot^-$. In above system, various transition metals and oxides thereof are generally used as catalysts. At present, how to effectively immobilize, separate and regenerate the catalysts, realize the reuse, and strictly prevent and control the leaching of metal ions are still main problems restricting the engineering applications of such methods.

As a non-metal nano-material, the graphene oxide (GO) flake has a two-dimensional layer structure with a thickness of approximate a single carbon atom, which is mainly composed of $sp^2$ hybrid 6-membered carboatomic ring, a large number of hydroxyl, carboxyl and epoxy groups. Comparing with graphene, GO has a stronger hydrophilia and a relatively lower cost, is easier to realize functionalization, and is very suitable for preparation of novel membrane materials. Studies have found that under strong basicity and certain temperature conditions, oxygen-containing groups on the GO surface will be partially reduced, and sawtooth-shaped defects will be formed on the carbon atom layer, to form reduced graphene oxide (rGO). This not only enables rGO to obtain stronger persulphate and ozone catalytic activities, can generate a large number of $SO_4 \cdot^-$ or ·OH radicals, but also significantly reduces the friction of water molecules on the surface of the carbon material, and is beneficial to improve the water transport performance of GO membrane material and reduce the transmembrane pressure. If the rGO flakes can be utilized to establish a membrane separation system with catalytic and oxidation functions, it will effectively overcome the inherent shortcomings of the traditional membrane separation technique and advanced oxidation process, and become a new method for controlling micro-pollutants in water.

It should be noted that the reaction device is the place where water is treated, and is also a key factor in determining the treatment effect. The existing water treatment reaction device and its control method cannot achieve membrane separation and catalytic oxidation functions at the same time, and the reasons comprise: (1) In the existing device, NF and RO membrane assemblies can be used for efficient separation of pollutants, however, adding oxidants in the raw water will not only be incapable of generating strong oxidizing free radicals that are enough to decompose the retained pollutants, but also will cause serious damage to the membrane structure, resulting in significant reduction in its separation efficiency; (2) In the existing device, in order to give full play to its catalyst efficiency, during the reaction, methods such as reducing the size of the catalyst and increasing the mixing intensity are usually used. After the reaction finished, the catalyst needs to be separated again to obtain the treated water. The above operation method is difficult to very implement in the industrialized continuous operation; (3) In the existing device, it does not possess the in-situ regeneration function of the deactivated catalyst, and the operation of the device can only be ensured by regularly replacing the catalyst, which will inevitably increase the operating cost.

Therefore, how to innovate the configuration design of the reaction device and its control method to give play to the separation and catalytic functions of the reduced graphene oxide membrane to the greatest extent, has become the key to utilize this new water treatment technique to efficiently remove micro-pollutants in water.

SUMMARY OF THE INVENTION

The technical problem to be solved by the present disclosure is to provide an advanced water treatment device and its method, which can give full play to the catalytic oxidation and separation and retainment functions of the carbon nano-material composite membrane and will not cause non-regenerative damage to the structure of the carbon nano-material composite membrane.

To solve the above technical problems, the present disclosure employs the following technical solution:

A purpose of the present disclosure is to provide an advanced water treatment device comprising a plate-and-frame membrane module having a water inlet pipe and a water outlet pipe, a raw water delivery system communicating with the water inlet pipe of the plate-and-frame membrane module, and a clear water reservoir communicating with the water outlet pipe of the plate-and-frame membrane module, the advanced water treatment device further comprises an oxidant dosing system communicating with the water inlet pipe of the plate-and-frame membrane module or the raw water delivery system, the plate-and-frame membrane module further comprises one or more carbon nano-material composite membranes, the carbon nano-material composite membranes comprise carbon nano-material layer and base membrane layer supporting the carbon nano-material layer which are sequentially disposed between the water inlet pipe and the water outlet pipe, and materials of the carbon nano-material layer comprise mono-layer reduced graphene oxide and multiwalled carbon nanotubes.

In the present disclosure, by the effects of coupling of the mono-layer reduced graphene oxide and the multiwalled carbon nanotubes in the carbon nano-material layer and the oxidant in the oxidant dosing system, strong oxidizing free radicals decomposing the pollutants are generated by catalyzing, and at the same time, the oxidant will not cause damage to the structure of the base membrane layers. A mixed liquid of the raw water to be treated and the oxidant zigzags in the micro layer structure of the carbon nano-material composite membranes, and at the same time, the catalytic oxidation and the separation and retainment happen, thus the organic micro-pollutants in water are effectively removed. Furthermore, in the present disclosure, the carbon nano-material layer is carried on the base membrane layer, and the base membrane layer can play a role of supporting, thus the strength of the carbon nano-material composite membranes is enhanced.

Preferably, a mass ratio of the reduced graphene oxide (rGO) and the multiwalled carbon nanotubes (MWCNTs) in the carbon nano-material layer is (2-4):1.

Preferably, the reduced graphene oxide is in a flake shape, with a diameter of 2-5 μm, a thickness of 0.8-1.2 nm, an atomic ratio of carbon to oxygen of (3-4):1.

Wherein, the reduced graphene oxide is prepared by taking commercially purchased graphene oxide as raw material, obtaining an graphene oxide dispersion liquid by ultrasonic-assisted dispersion method, wherein the ultrasonic power density is 4-6 $W \cdot mL^{-1}$, and the ultrasonic time is 20-30 min, and then adjusting pH to >10 by adding an ammonia solution with a mass fraction of 10%, and heated under confinement at 120° C. for 3-4 h.

In the present disclosure, the measuring method of the ultrasonic power density is ultrasonic intensity divided by the dispersion liquid volume.

Preferably, the multiwalled carbon nanotubes have an inner diameter of 2-5 nm, an outer diameter of <8 nm, a length of 1-2 μm, and a specific surface area of >500 $m^2/g$.

Wherein, the multiwalled carbon nanotubes are commercially purchased.

The present disclosure adopts the reduced graphene oxide and the multiwalled carbon nanotubes with the above-mentioned parameters and mass ratio, so that the carbon nano-material layer has a better micro layer structure, which thus can better remove organic micro-pollutants in water and has small resistance to water.

Preferably, a loading amount of the carbon nano-material layer on the surface of the base membrane layer in the carbon nano-material composite membranes is 8-32 $g/m^2$, so that a trade off between the resistance to water and the effect of filtration is obtain.

Preferably, pure water flux of the carbon nano-material composite membranes is 30-90 $L \cdot (m_2 \cdot h \cdot bar)^{-1}$.

In the present disclosure, the method for testing the pure water flux of the carbon nano-material composite membranes is to measure the volume of pure water passing through unit membrane area in unit time under conditions of 25° C. room temperature and 1 bar constant pressure.

Preferably, specific resistance of the carbon nano-material composite membranes is $1.0\text{-}2.0\times10^{18}$ $m^{-2}$.

In the present disclosure, the method for testing the specific resistance of the carbon nano-material composite membranes is to calculate composite membrane resistance under constant pressure according to Carman equation, and then calculate resistance of the carbon nano-material layer per unit thickness, that is, specific resistance, from the membrane resistance and the thickness of the carbon nano-material layer.

Specifically: under room temperature, using a composite membrane to filter pure water, and measuring the membrane resistance $Rm=\Delta p/(u\times\mu)$ in $m^{-1}$; wherein, $\Delta p$ is filtration pressure, the value is a standard atmospheric pressure, in Pa, is filtration speed, in m/s; and $\mu$ is the viscosity of water at room temperature, in Pa·s.

Due to that the base membrane resistance is very small, it is ignored, and the composite membrane resistance Rm is the resistance of the carbon nano-material layer.

The calculation method of the specific resistance is:

the specific resistance $rc=Rm/\delta$; wherein, $\delta$ is the thickness of the carbon nano-material layer of the composite membrane, in m.

Preferably, the filtration area of the carbon nano-material composite membrane is not less than 0.1 $m^2$, thus can improve the filtration effect and filtration efficiency.

In the present disclosure, the method for testing the filtration area of the carbon nano-material composite membrane is to calculate according to a diameter of a circular opening on a side of the filter plate of the plate-and-frame membrane module.

Preferably, a base membrane of the base membrane layer is selected from the group consisting of a nylon membrane, poly(vinylidene fluoride) membrane, a hydrophilic modified polytetrafluoroethylene membrane, and combinations thereof; a filter pore diameter of the base membrane is below 0.45 μm, so that the carbon nano-material composite membranes have a better supporting force, and the carbon nano-material composite layer is not easy to penetrate the base membrane when being loaded thereon.

In the present disclosure, the base membrane may be commercially purchased.

In the present disclosure, the carbon nano-material composite membranes are obtained by evenly loading both the reduced graphene oxide and the multiwalled carbon nanotubes on the surface of the base membrane, specifically, by preparing a multiwalled carbon nano-tube dispersion liquid and a reduced graphene oxide dispersion liquid using ultrasonic-assisted method with a ultrasonic power density of 4-6 $W \cdot mL^{-1}$ and a ultrasonic time of 20-30 min; mixing the multiwalled carbon nano-tube dispersion liquid and the reduced graphene oxide dispersion liquid according to the mass ratio of the two carbon nano-materials, repeating the ultrasonic operation with a ultrasonic power density of 4-6 $W \cdot mL^{-1}$ and a ultrasonic time of 20-30 min; and finally, loading the two carbon nano-materials on the base membrane using a vacuum filtration method.

Preferably, the plate-and-frame membrane module further comprises a flow guide screen plate disposed between the water inlet pipe and the carbon nano-material layer, a silica gel seal ring disposed between the flow guide screen plate and the carbon nano-material layer, and an orifice plate disposed between the base membrane layer and the water outlet pipe, so that water is evenly distributed on the entire filtering surface, thereby improving the filtration efficiency.

Further preferably, the orifice plate comprises a base plate, a plurality of flow guide trenches provided on the base plate, and a plurality of flow guide holes provided on the flow guide trenches, and the structure of the orifice plate causes water to be more evenly distributed.

Further preferably, one flow guide screen plate, one silica gel seal ring, one carbon nano-material composite membrane and one orifice plate form a membrane separation assembly, and the plate-and-frame membrane module comprises a plurality of the membrane separation assemblies arranged side by side, so that the filtration efficiency can be improved.

Further preferably, the plate-and-frame membrane module further comprises a thrust plate, a front partition plate arranged on a rear side of the thrust plate, a pressing plate, a rear partition plate arranged on a front side of the pressing plate, a plurality of filter plates arranged between the front partition plate and the rear partition plate, one or more middle partition plates arranged between two adjacent filter plates, a tight plate and a fastener for fixing the respective components of the plate-and-frame membrane module; the membrane separation assemblies are provided between the front partition plate and the filter plates, between the filter plates and the middle partition plates, and between the filter plates and the rear partition plate; the front partition plate, the middle partition plates, the rear partition plate and the filter plates respectively have internal cavities, and a side of the front partition plate close to the filter plates and a side of the rear partition plate close to the filter plates are respectively provided with an opening communicating with the internal cavities, and both sides of the middle partition plates and both sides of the filter plates are provided with openings communicating with the internal cavities; lower portions of the front partition plate, the middle partition plates and the rear partition plate respectively connect the internal cavities with the water inlet pipe via first communicating pipes; and upper portions of the filter plates connect the internal cavities with the water outlet pipe via second communicating pipes, so that the structure of the advanced water treatment device is simple and easy to prepare and maintain.

More preferably, the cross-sectional area of the internal cavity is the same as the filtration area of the carbon nano-material composite membrane, so that the carbon nano-material composite membranes can be utilized to the greatest extent, avoiding material waste.

According to a specific and preferred implementation, the cross section of the internal cavities is circular.

More preferably, dimensions of the front partition plate, the middle partition plates and the rear partition plate are the same, and the thickness of the filter plate is 1.2 to 1.5 times the thickness of the middle partition plates, therefore, it is convenient for water on both sides to enter the inner cavities of the filter plates, and the pressure difference between the two sides of the membrane separation assemblies is prevented from being too large.

Wherein, the same dimension of the front partition plate, the middle partition plates, and the rear partition plate means that the shape of the appearance and the size of the internal cavity are the same.

In the present disclosure, the number of the membrane separation assemblies can be flexibly set according to the raw water flow rate requirements, and preferably, the number of the membrane separation assemblies is 4-16, that is, the number of filter plates is 2-8, and the number of the middle partition plates is 1-7.

Preferably, the raw water delivery system comprises a raw water tank, a first pipeline communicating with the raw water tank, a pressure pump communicating with the first pipeline, a second pipeline respectively communicating with the pressure pump and the water inlet pipe, a first valve and a first flow meter arranged on the first pipeline, and a second valve arranged on the second pipeline; the oxidant dosing system comprises an oxidant storage tank, a third pipeline communicating with the oxidant storage tank, a dosing pump communicating with the third pipeline, a fourth pipeline respectively communicating with the dosing pump and the first pipeline, a third valve arranged on the third pipeline, and a second flow meter arranged on the fourth pipeline.

Preferably, the oxidant dosed by the oxidant dosing system is a persulfate solution or an ozone aqueous solution.

Preferably, the advanced water treatment device further comprises a pressure gauge arranged on the water inlet pipe, so as to facilitate monitoring when the membrane function is to be regenerated.

Preferably, the advanced water treatment device further comprises a membrane function regeneration system, and the membrane function regeneration system comprises an ammonia stirring and sealed storage tank, a fifth pipeline communicating with the ammonia stirring and sealed storage tank, a circulating water pump communicating with the fifth pipeline, a sixth pipeline communicating with the circulating water pump, a heat exchanger communicating with the sixth pipeline, a seventh pipeline respectively communicating with the heat exchanger and the water inlet pipe, an eighth pipeline respectively communicating with the water outlet pipe and a bottom portion of the ammonia stirring and sealed storage tank, a fourth valve and a third flow meter arranged on the fifth pipeline, a fifth valve arranged on the seventh pipeline, and a sixth valve arranged on the eighth pipeline, and the advanced water treatment device further comprises a seventh valve arranged on the water outlet pipe between the junction of the eighth pipeline and the water outlet pipe and the clean water reservoir.

Due to long-term operation, the catalytic performance and water transport performance of carbon nano-material will be reduced due to the consumption and masking of surface active sites. By providing the membrane function regeneration system, the present disclosure can realize the in-situ regeneration of the catalytic activity and surface hydrophobicity of the carbon nano-material, significantly prolong the service life of the composite membrane, and avoid the need for additional processes such as catalyst collection, regeneration and reuse in the prior art.

Further preferably, the ammonia stored in the ammonia stirring and sealed storage tank has a mass concentration of 4%-10% and pH not lower than 10, so that the membrane function regeneration effect is better.

Preferably, in the raw water to be treated stored in the raw water delivery system, the concentration of organic micropollutants is below 0.5 mg/L, the total organic carbon concentration is less than 1 mg/L, there is no suspended matter, and the pH is 6-9.

The second purpose of the present disclosure is to provide an advanced water treatment method using the advanced water treatment device, the advanced water treatment device comprising a plate-and-frame membrane module having a water inlet pipe and a water outlet pipe, a raw water delivery system communicating with the water inlet pipe of the plate-and-frame membrane module, an oxidant dosing system communicating with the water inlet pipe of the plate-and-frame membrane module or the raw water delivery system, and a clear water reservoir communicating with the water outlet pipe of the plate-and-frame membrane module;

the plate-and-frame membrane module further comprises one or more carbon nano-material composite membranes, the carbon nano-material composite membranes comprise carbon nano-material layers, and base membrane layers supporting the carbon nano-material layers which are sequentially disposed between the water inlet pipe and the water outlet pipe, and raw materials of the carbon nano-material layers comprise mono-layer reduced graphene oxide and multiwalled carbon nanotubes;

the raw water delivery system comprises a raw water tank storing the raw water to be treated;

the oxidant dosing system comprises an oxidant storage tank storing the oxidant;

the advanced water treatment device further comprises a membrane function regeneration system for regenerating the carbon nano-material composite membranes in the plate-and-frame membrane module;

the membrane function regeneration system comprises an ammonia stirring and sealed storage tank storing the ammonia, and a heat exchanger communicating with the ammonia stirring and sealed storage tank and the water inlet pipe for heating the ammonia;

the advanced water treatment device further comprises a pressure gauge arranged on the water inlet pipe;

the advanced water treatment method comprises the following steps:

(1) mixing the raw water to be treated stored in the raw water tank and the oxidant stored in the oxidant storage tank and transporting to the plate-and-frame membrane module, both catalytic oxidation and membrane filtration of the mixture of raw water and the oxidant occurs by the action of the carbon nanomaterial composite membranes, and discharging the treated effluent through the water outlet pipe;

(2) stopping dosing the raw water to be treated and the oxidant into the plate-and-frame membrane module when the reading of the pressure gauge is close to 5 bar, transporting the ammonia stored in the ammonia stirring and sealed storage tank after being heated by the heat exchanger to the plate-and-frame membrane module to in-situ regenerate the carbon nano-material composite membranes, and stopping the in-situ regeneration when the reading of the pressure gauge is below 1.5 bar or after running for 4-8 hours.

In the present disclosure, by the effects of coupling of the mono-layer reduced graphene oxide and the multiwalled carbon nanotubes in the carbon nano-material layer and the oxidant in the oxidant dosing system, strong oxidizing free radicals decomposing the pollutants are generated by catalyzing, and at the same time, the oxidant will not cause damage to the structure of the base membrane layers. A mixed liquid of the raw water to be treated and the oxidant zigzags in the micro layer structure of the carbon nano-material composite membranes, and at the same time, the catalytic oxidation and the separation and retainment happen, thus the organic micro-pollutants in water are effectively removed. Furthermore, in the present disclosure, the carbon nano-material layer is carried on the base membrane layer, and the base membrane layer can play a role of supporting, thus the strength of the carbon nano-material composite membranes is enhanced.

Due to long-term operation, the catalytic performance and water transport performance of carbon nano-material will be reduced due to the consumption and masking of surface active sites. By providing the membrane function regeneration system, the present disclosure can realize the in-situ regeneration of the catalytic activity and surface hydrophobicity of the carbon nano-material, significantly prolong the service life of the composite membrane, and avoid the need for additional processes such as catalyst collection, regeneration and reuse in the prior art.

In the present disclosure, in addition to the adjustable parameters such as oxidant type, oxidant dosage, raw water flow rate, carbon nano-material loading, etc., the number of filter plates in the plate-and-frame membrane module can also be flexibly provided according to the amount of water to be treated and water quality, and the filtration area and the amount of catalyst are also changed accordingly. In addition, $SO_4 \cdot^-$ (standard oxidation potential 2.5-3.1 V) or ·OH (standard oxidation potential 2.7 V) with strong oxidizing properties plays a central role in the removal of micro-pollutants, and the oxidation effect of these two free radicals is effective to most of organic pollutants. Therefore, the present disclosure has good adaptability of water quantity and water quality.

Preferably, the oxidant stored in the oxidant storage tank is a persulfate solution or an ozone aqueous solution.

Further preferably, when the oxidant is a persulfate solution, controlling the temperature of the oxidant to be lower than 30° C.; when the oxidant is an ozone solution, controlling the temperature of the oxidant to be 0-4° C., so that the solubility of the oxidant is higher, which is more conducive to oxidation.

Further preferably, when the oxidant is a persulfate solution, controlling an initial molar concentration ratio of persulfate to organic micro-pollutants in the mixture to be (50-200):1; when the oxidant is an ozone solution, controlling an initial mass concentration ratio of ozone to organic micro-pollutants in the mixture to be (10-50):1; thus, while ensuring the oxidation effect to remove organic micro-pollutants, it avoids the waste of oxidants and saves costs.

Preferably, controlling the flow rate of the raw water to be treated corresponds to a membrane flux of 0.5-5.0 $L \cdot min^{-1} \cdot m^{-2}$, and controlling the flow of the oxidant to be no greater than 5% of the flow of the raw water to be treated, so as to ensure the effect of water treatment.

Wherein, the membrane flux to which the flow rate of the raw water to be treated corresponds refers to a ratio of the flow rate of the raw water to be treated to the total filtration area of the plate-and-frame membrane module.

Preferably, in Step (1), controlling the reading of the pressure gauge to be no greater than 5 bar, and when the reading of the pressure gauge is greater than 5 bar, it indicates that the catalytic performance and water transport performance of the carbon nano-material have reduced, which is not conducive to water treatment.

Preferably, controlling the flow rate of the ammonia corresponds to a membrane flux of 0.1-0.4 $L \cdot min^{-1} \cdot m^{-2}$, and the ammonia stored in the ammonia stirring and sealed storage tank has a mass concentration of 4%-10% and pH not lower than 10. So that it is conducive to the activation and regeneration of the carbon nano-material by the ammonia.

Wherein, the flow rate of the ammonia corresponds to a membrane flux refers to a ratio of the flow rate of the ammonia to the total filtration area of the plate-and-frame membrane module.

Preferably, controlling the temperature of the ammonia at the outlet of the heat exchanger to be 120-150° C., so as to be conducive to improve the activation and regeneration efficiency of ammonia.

Preferably, a mass ratio of the reduced graphene oxide to the multiwalled carbon nanotubes in the carbon nano-material layer is (2-4):1; the reduced graphene oxide is in a flake shape, with a diameter of 2-5 μm, a thickness of 0.8-1.2 nm, an atomic ratio of carbon to oxygen of (3-4):1, and a mono-layer rate of >95%; the multiwalled carbon nanotubes have an inner diameter of 2-5 nm, an outer diameter of <8 nm, a length of 1-2 and a specific surface area of >500 m²/g; a loading amount of the carbon nano-material layer on the surface of the base membrane layer in the carbon nano-material composite membranes is 8-32 g/m², pure water flux of the carbon nano-material composite membranes is 30-90 L·(m²·h·bar)⁻¹, the unit specific resistance is $1.0-2.0\times10^{18}$ m⁻², and the filtration area is not less than 0.1 m²; a base membrane of the base membrane layer is selected from the group consisting of a nylon membrane, poly(vinylidene fluoride) membrane, a hydrophilic modified polytetrafluoroethylene membrane, and combinations thereof; a filter pore diameter of the base membrane is below 0.45 μm.

Preferably, the plate-and-frame membrane module further comprises a flow guide screen plate disposed between the water inlet pipe and the carbon nano-material layer, a silica gel seal ring disposed between the flow guide screen plate and the carbon nano-material layer, and an orifice plate disposed between the base membrane layer and the water outlet pipe; the orifice plate comprises a base plate, a plurality of flow guide trenches provided on the base plate, and a plurality of flow guide holes provided on the flow guide trenches.

Further preferably, one flow guide screen plate, one silica gel seal ring, one carbon nano-material composite membrane and one orifice plate form a membrane separation assembly, and the plate-and-frame membrane module comprises a plurality of membrane separation assemblies arranged side by side.

Further preferably, the plate-and-frame membrane module further comprises a thrust plate, a front partition plate arranged on a rear side of the thrust plate, a pressing plate, a rear partition plate arranged on a front side of the pressing plate, a plurality of filter plates arranged between the front partition plate and the rear partition plate, one or more middle partition plates arranged between two adjacent filter plates, a tight plate and a fastener for fixing the respective components of the plate-and-frame membrane module; the membrane separation assemblies are provided between the front partition plate and the filter plates, between the filter plates and the middle partition plates, and between the filter plates and the rear partition plate; the front partition plate, the middle partition plates, the rear partition plate and the filter plates respectively have internal cavities, and a side of the front partition plate close to the filter plates and a side of the rear partition plate close to the filter plates are respectively provided with an opening communicating with the internal cavities, and both sides of the middle partition plates and both sides of the filter plates are provided with openings communicating with the internal cavities; lower portions of the front partition plate, the middle partition plates and the rear partition plate respectively connect the internal cavities with the water inlet pipe via first communicating pipes; and upper portions of the filter plates connect the internal cavities with the water outlet pipe via second communicating pipes.

More preferably, the cross-sectional area of the internal cavity is the same as the filtration area of the carbon nano-material composite membrane; dimensions of the front partition plate, the middle partition plates and the rear partition plate are the same, and the thickness of the filter plate is 1.2 to 1.5 times the thickness of the middle partition plates.

Preferably, the raw water delivery system further comprises a first pipeline communicating with the raw water tank, a pressure pump communicating with the first pipeline, a second pipeline respectively communicating with the pressure pump and the water inlet pipe, a first valve and a first flow meter arranged on the first pipeline, and a second valve arranged on the second pipeline; the oxidant dosing system further comprises a third pipeline communicating with the oxidant storage tank, a dosing pump communicating with the third pipeline, a fourth pipeline respectively communicating with the dosing pump and the first pipeline, a third valve arranged on the third pipeline, and a second flow meter arranged on the fourth pipeline; the membrane function regeneration system further comprises a fifth pipeline communicating with the ammonia stirring and sealed storage tank, a circulating water pump communicating with the fifth pipeline, a sixth pipeline respectively communicating with the circulating water pump and the heat exchanger, a seventh pipeline respectively communicating with the heat exchanger and the water inlet pipe, an eighth pipeline respectively communicating with the water outlet pipe and a bottom portion of the ammonia stirring and sealed storage tank, a fourth valve and a third flow meter arranged on the fifth pipeline, a fifth valve arranged on the seventh pipeline, and a sixth valve arranged on the eighth pipeline, and the advanced water treatment device further comprises a seventh valve arranged on the water outlet pipe between the junction of the eighth pipeline and the water outlet pipe and the clean water reservoir.

Preferably, in the raw water to be treated stored in the raw water delivery system, the concentration of organic micro-pollutants is below 0.5 mg/L, the total organic carbon concentration is less than 1 mg/L, there is no suspended matter, and the pH is 6-9.

Preferably, in Step (1), controlling the flow rate of the raw water to be treated via the first valve.

Preferably, in Step (1), the dosage of the oxidant is controlled by adjusting the rotation speed of the dosing pump.

Due to the implementation of the above technical solutions, the present disclosure has the following advantages over the prior art:

(1) Carbon nano-materials act as catalysts and separation media at the same time, and compared with the traditional use of metal-containing dispersed catalysts, during the reaction, there is no leaching problem of heavy metal affecting the quality of the treated water, and there is no need to add additional catalyst separation steps, the treatment process is shorter, and the device components are simpler;

(2) By giving full play to the characteristics of low resistance and high catalytic activity of the carbon nano-material composite membranes, under the condition of treating the same amount of water, the trans-membrane pressure is much lower than traditional NF and RO membranes. The membrane separation process is used as a reaction platform for catalytic oxidation, on the one hand, it can effectively remove micro-pollutants in water by generating strong oxidizing free radicals such as $SO_4^{\cdot-}$ or $\cdot OH$, on the other hand, it also provides a reliable self-cleaning ability to the composite membrane, effectively reduce membrane pollution, and will not produce concentrated water; the above functions are not available in traditional membrane separation assemblies;

(3) The advanced water treatment device and method of the present disclosure have high purification efficiency, low treatment energy consumption, no secondary pollution of heavy metals, and wide application range.

BRIEF DESCRIPTION OF THE DRAWINGS

For more clearly explaining the technical solutions in the embodiments of the present disclosure or the prior art, the accompanying drawings used to describe the embodiments or the prior art are simply introduced in the following. Apparently, the below described drawings merely show a part of the embodiments of the present disclosure, and those skilled in the art can obtain other drawings according to the accompanying drawings without creative work.

wherein, 1—plate-and-frame membrane module; 2—clean water reservoir; 3—seventh valve; 4—pressure gauge; 11—thrust plate; 12—front partition plate; 13—filter plate; 14—silica gel seal ring; 15—flow guide screen plate; 16—carbon nano-material composite membrane; 17—orifice plate; 18—middle partition plate; 19—rear partition plate; 20—pressing plate; 21—water inlet pipe; 22—water outlet pipe; 23—tight plate; 24—fastener; 25—internal cavity; 26—first communicating pipe; 27—second communicating pipe; 31—raw water tank; 32—first pipeline; 33—pressure pump; 34—second pipeline; 35—first valve; 36—first flow meter; 37—second valve; 41—oxidant storage tank; 42—third pipeline; 43—dosing pump; 44—fourth pipeline; 45—third valve; 46—second flow meter; 51—ammonia stirring and sealed storage tank; 52—fifth pipeline; 53—circulating water pump; 54—sixth pipeline; 55—heat exchanger; 56—seventh pipeline; 57—eighth pipeline; 58—fourth valve; 59—third flow meter; 60—fifth valve; 61—sixth valve; 171—base plate; 172—flow guide trench; 173—flow guide hole.

DETAILED DESCRIPTION OF EXEMPLARY EMBODIMENTS

In the following, the present disclosure is further explained in detail combining with the accompanying drawings and specific embodiments, but the present disclosure is not limited to the following embodiments. The specific experimental methods that are not indicated in the embodiments are carried out in accordance with the national standard methods and conditions.

Figure 1:
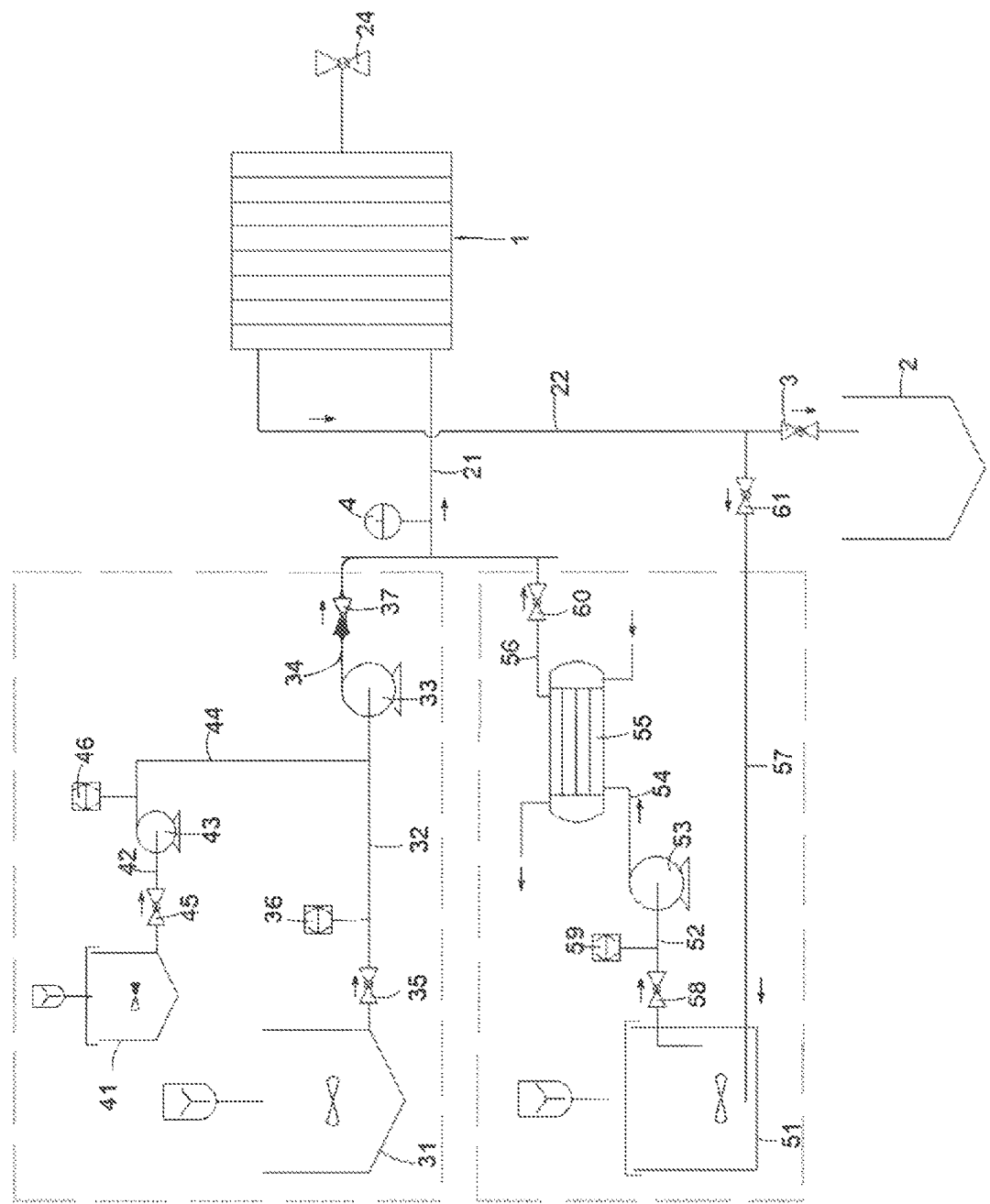
FIG. 1 is a schematic structure diagram of an advanced water treatment device in a specific implementation.

An advanced water treatment device as shown in FIG. 1 comprises a plate-and-frame membrane module 1, a raw water delivery system, an oxidant dosing system, a membrane function regeneration system, a clear water reservoir 2, and the like. The raw water delivery system and the oxidant dosing system are connected via pipelines, and are connected to a water inlet pipe 21 of the plate-and-frame membrane module 1 after being connected with the membrane function regeneration system in parallel, and a water inlet pipe 21 of the plate-and-frame membrane module 1 is connected to the clear water reservoir 2.

The raw water delivery system comprises a raw water tank 31, a first pipeline 32 communicating with the raw water tank 31, a pressure pump 33 communicating with the first pipeline 32, a second pipeline 34 respectively communicating with the pressure pump 33 and the water inlet pipe 21, a first valve 35 and a first flow meter 36 arranged on the first pipeline 32, and a second valve 37 arranged on the second pipeline 34. The first flow meter 36 is located between the first valve 35 and the pressure pump 33.

The oxidant dosing system comprises an oxidant storage tank 41, a third pipeline 42 communicating with the oxidant storage tank 41, a dosing pump 43 communicating with the third pipeline 42, a fourth pipeline 44 respectively communicating with the dosing pump 43 and the first pipeline 32, a third valve 45 arranged on the third pipeline 42, and a second flow meter 46 arranged on the fourth pipeline 44. The oxidant dosed by the oxidant dosing system is a persulfate solution or an ozone aqueous solution.

The junction of the fourth pipeline 44 and the first pipeline 32 is located between the first flow meter 36 and the pressure pump 33. The raw water from the first pipeline 32 and the oxidant from the fourth pipeline 44 run into the pressure pump 33, and after being pressurized by the pressure pump 33, run into the water inlet pipe 21 via the second pipeline 34.

The membrane function regeneration system comprises an ammonia stirring and sealed storage tank 51, a fifth pipeline 52 communicating with the ammonia stirring and sealed storage tank 51, a circulating water pump 53 communicating with the fifth pipeline 52, a sixth pipeline 54 communicating with the circulating water pump 53, a heat exchanger 55 communicating with the sixth pipeline 54, a seventh pipeline 56 respectively communicating with the heat exchanger 55 and the water inlet pipe 21, an eighth pipeline 57 respectively communicating with the water outlet pipe 22 and a bottom portion of the ammonia stirring and sealed storage tank 51, a fourth valve 58 and a third flow meter 59 arranged on the fifth pipeline 52, a fifth valve 60 arranged on the seventh pipeline 56, and a sixth valve 61 arranged on the eighth pipeline 57. The third flow meter 59 is located between the fourth valve 58 and the circulating water pump 53. Wherein, the flow direction of the heat source (such as hot water, hot air, hot oil) of the heat exchanger 55 is opposite to the flow direction of the ammonia so as to facilitate the heating of the ammonia.

The advanced water treatment device further comprises a seventh valve 3 arranged on the water outlet pipe 22 between the junction of the eighth pipeline 57 and the water outlet pipe 22 and the clean water reservoir 2.

The advanced water treatment device further comprises a pressure gauge 4 arranged on the water inlet pipe 21. The raw water and the oxidant run into the plate-and-frame membrance module 1 through the pressure gauge 4 after being pressurized by the pressure pump 33, and the ammonia run into the plate-and-frame membrane module 1 through the pressure gauge 4 after being heated by the heat exchanger 55.

The raw water tank 31, the oxidant storage tank 41 and the ammonia stirring and sealed storage tank 51 are respectively provided with stirrers.

The water inlet pipe 21, the water outlet pipe 22, the first pipeline 32, the second pipeline 34, the third pipeline 42, the fourth pipeline 44, the fifth pipeline 52, the sixth pipeline 54, the seventh pipeline 56, and the eighth pipeline 57 are all used 304 stainless steel pipe.

Figure 4:
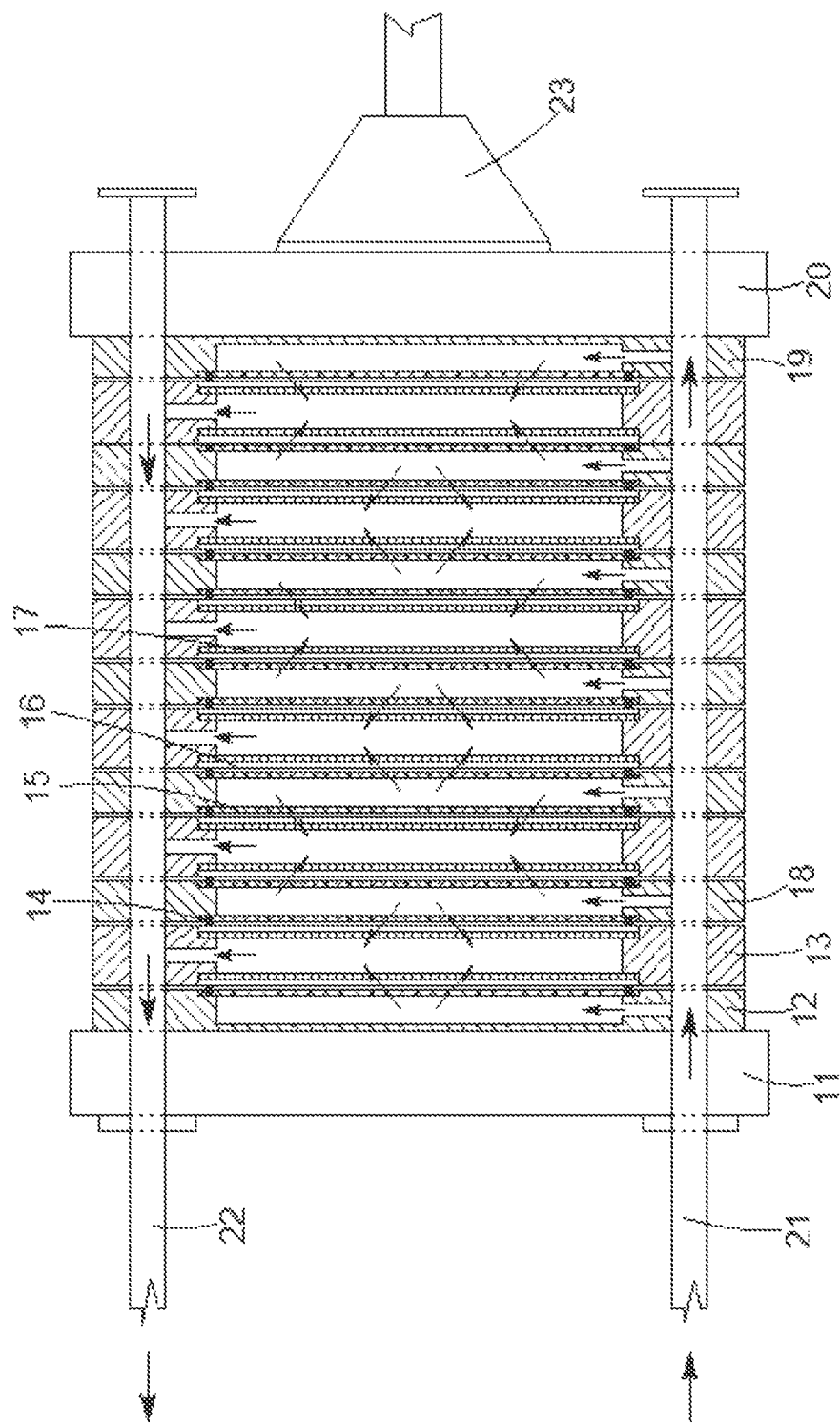
FIG. 4 is a cross-section diagram of a plate-and-frame membrane module in a specific implementation.

As shown in FIG. 4, the plate-and-frame membrane module 1 comprises one thrust plate 1, one front partition plate 12, a plurality of filter plates 13, a plurality of silica gel seal rings 14, a plurality of flow guide screen plates 15, a plurality of carbon nano-material composite membranes 16, a plurality of orifice plates 17, a plurality of middle partition plates 18, one rear partition plate 19, one pressing plate 20, one water inlet pipe 21, one water outlet pipe 22, one tight plate 23 and one fastener 24.

The thrust plate 11 is placed at the front end, followed by the front partition plate 12, and then the filter plates 13 (made of 304 stainless steel) and the middle partition plates 18 (made of 304 stainless steel) are placed alternately, and the rear partition plate 19 is placed behind the last filter plate 13, and the pressing plate 20, the tight plate 23 and the fastener 24 fix the components to ensure sealing.

The water inlet pipe 21 and the water outlet pipe 22 are respectively arranged at the lower and upper portions of the plate-and-frame membrane module 1 and pass through the entire reactor.

The front partition plate 12 and the rear partition plate 19 are respectively provided with an internal cavity 25 with a circular cross-section (the cross-sectional area of the internal cavity 25=the filtration area of the carbon nano-material composite membrane 16), and the sides adjacent to the filter plates 13 are respectively provided with an opening communicating with the internal cavities 25 and covered with the flow guide screen plate 15, and the other sides thereof are closed, and at the lower end the internal cavities 25 are communicated with the water inlet pipe 21 through the first communicating pipe 26.

Figure 5:
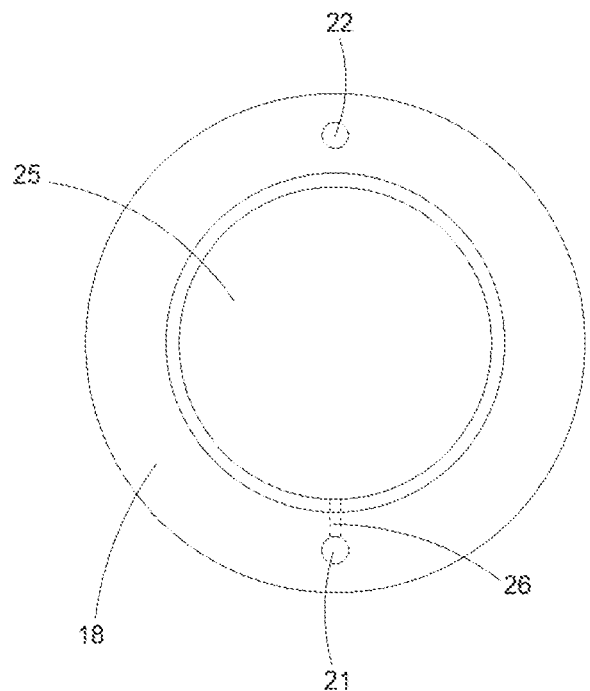
FIG. 5 is a side view of a middle partition plate in a specific implementation.

As shown in FIG. 5, the appearance and cavity size of the middle partition plates 18 are the same as that of the front partition plate 12 and the rear partition plate 19, while both sides of the middle partition plates 18 are respectively provided with an opening communicating with the internal cavities 25 and covered with the flow guide screen plate 15, and at the lower end the internal cavities 25 are communicated with the water inlet pipe 21 through the first communicating pipe 26.

Figure 6:
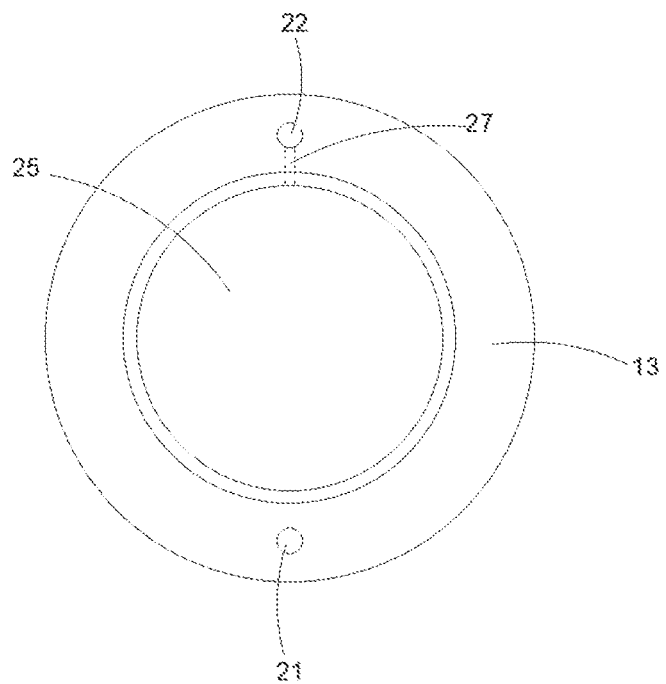
FIG. 6 is a side view of a filter plate in a specific implementation.

As shown in FIG. 6, the thickness of the filter plates 13 is 1.5 times the thickness of the middle partition plates 18, the filter plates 13 are respectively provided with an internal cavity 25 with a circular cross-section (the cross-sectional area of the internal cavity 25=the filtration area of the carbon nano-material composite membrane 16), and both sides of the filter plates 13 are respectively provided with an opening communicating with the internal cavities 25 and covered with the orifice plate 17, and at the upper end the internal cavities 25 are communicated with the water outlet pipe 22 through the second communicating pipe 27.

Figure 7:
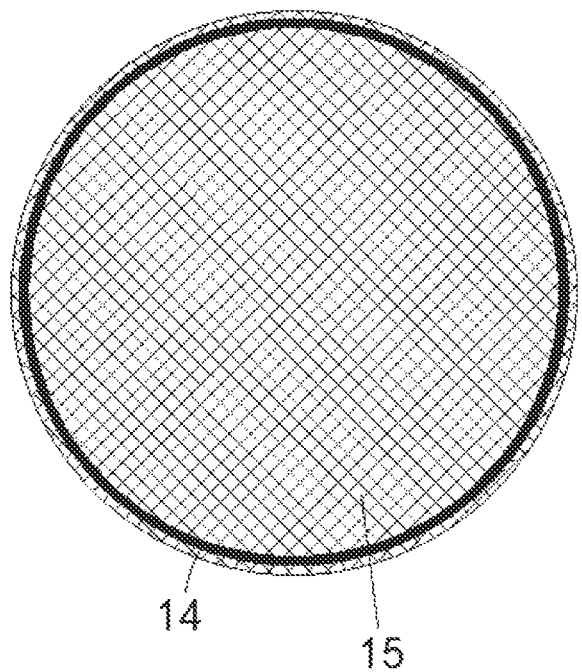
FIG. 7 is a side view of a flow guide screen plate in a specific implementation.
Figure 8:
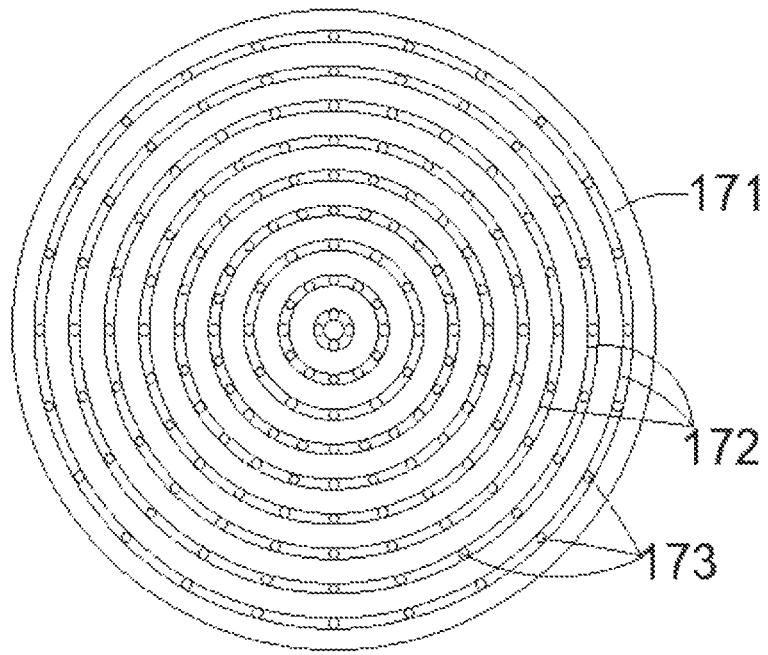
FIG. 8 is a side view of an orifice plate in a specific implementation.

As shown in FIG. 8, the orifice plate 17 comprises a base plate 171, a plurality of flow guide trenches 172 provided on the base plate 171, a plurality of flow guide holes 173 provided in each flow guide trench 172, and the flow guide trenches 172 are annular to facilitate the collection of filtrate. The carbon nano-material composite membranes 16 are placed on the orifice plates 17, and the flow guide screen plates 15 are inlaid with the silica gel seal rings 14 (as shown in FIG. 7), and the silica gel seal rings 14 are located between the flow guide screen plates 15 and the carbon nano-material composite membranes 16, and the carbon nano-material composite membranes 16 are located between the flow guide screen plates 15 and the orifice plates 17. When the respective components are fixed and pressed tightly, one flow guide screen plate 15, one silica gel seal ring 14, one carbon nano-material composite membrane 16 and one orifice plate 17 form a membrane separation assembly, so that multiple membrane separation assemblies are side by side arranged in the plate-and-frame membrane module 1.

Figure 2:
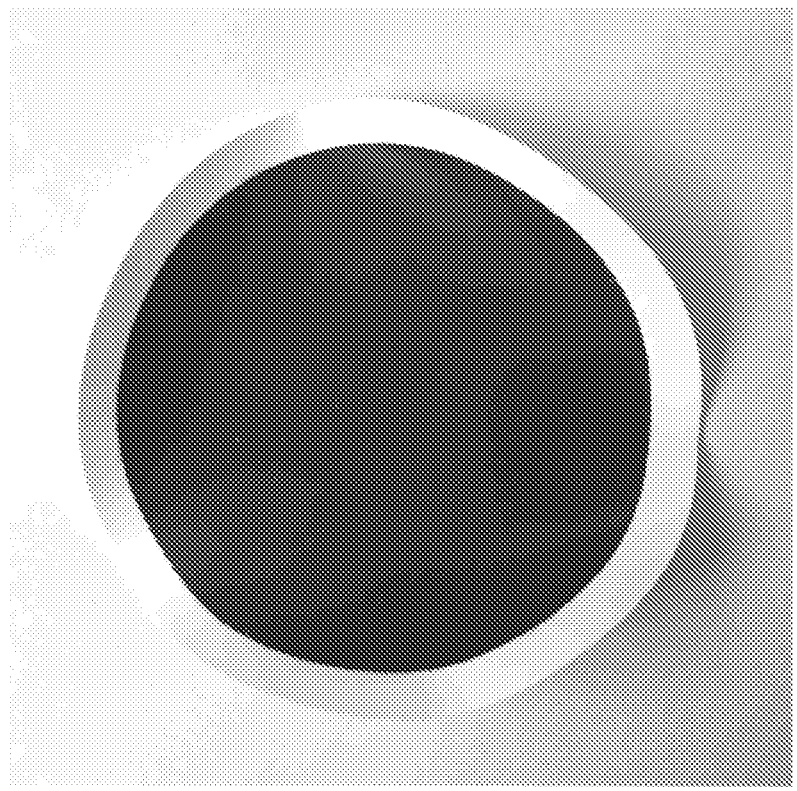
FIG. 2 is an electronic picture of a carbon nano-material composite membrane.
Figure 3:
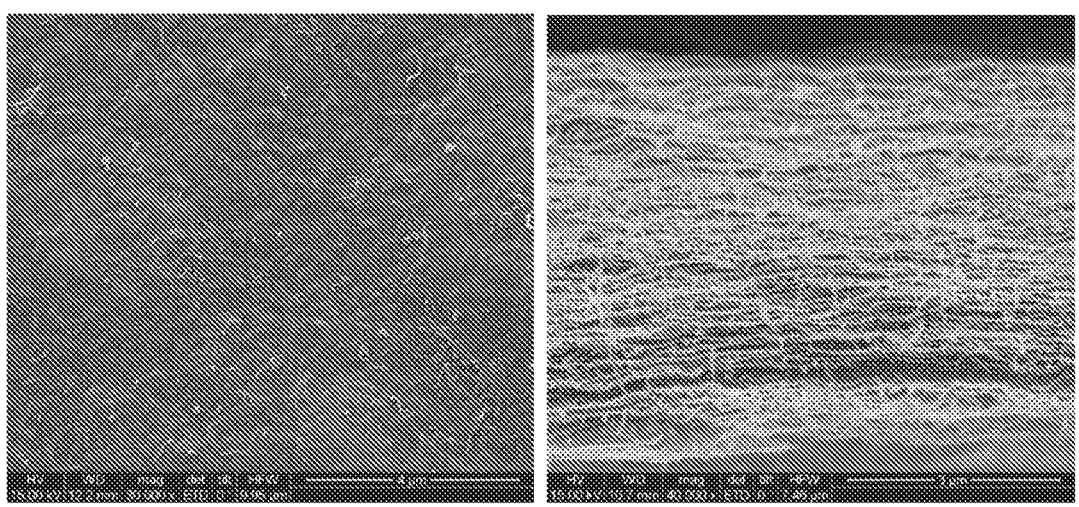
FIG. 3 is a scanning electron microscope picture of a carbon nano-material layer.

The carbon nanomaterial composite membranes 16 are prepared by uniformly loading reduced graphene oxide (rGO) and multiwalled carbon nanotubes (MWCNT) on the surfaces of base membranes at a mass ratio of (2-4):1, thereby forming carbon nano-material layers composed of reduced graphite oxide (rGO) and multiwalled carbon nanotubes (MWCNT) and base membrane layers, wherein an electronic picture of the carbon nano-material composite membranes 16 is shown in FIG. 2, and a scanning electron microscope picture of the carbon nano-material layers is shown in FIG. 3. Wherein, the carbon nano-material layers are located between the flow guide screen plates 15 and the base membrane layers, so that the mixture coming in from the water inlet pipe 21 enters the front partition plate 12, the plurality of middle partition plates 18, and the rear partition plate 19 through the first communicating pipe 26, and in the bottom-up flow process, is evenly distributed to the surfaces of the carbon nano-material layers after being guided by the flow guide screen plates 15; the mixture zigzags in the micro layer structure of the carbon nano-material composite membranes 16, and simultaneously undergoes catalytic oxidation and separation and retainment, which effectively removes organic micro-pollutants in water, after the treated water is collected by the orifice plates 17, it flows to the internal cavities 25 of the plurality of filter plates 13, and then runs into the water outlet pipe 22 through the second communicating pipe 27, and is transported to the clean water reservoir 2 by the water outlet pipe 22.

The reduced graphene oxide is in a flake shape, with a diameter of 2-5 μm, a thickness of 0.8-1.2 nm, an atomic ratio of carbon to oxygen of (3-4):1, and a mono-layer rate of >95%. Wherein, the reduced graphene oxide is prepared by taking commercially purchased graphene oxide as raw material, obtaining an graphene oxide dispersion liquid by ultrasonic-assisted dispersion method, wherein the ultrasonic power density is 4-6 $W \cdot mL^{-1}$, and the ultrasonic time is 20-30 min, and then adjusting pH to >10 by adding an ammonia solution with a mass fraction of 10%, and heated under confinement at 120° C. for 3-4 h. The multiwalled carbon nanotubes have an inner diameter of 2-5 nm, an outer diameter of <8 nm, a length of 1-2 μm, and a specific surface area of >500 m²/g. The base membrane of the base membrane layer is selected from the group consisting of a nylon membrane, poly(vinylidene fluoride) membrane, a hydrophilic modified polytetrafluoroethylene membrane, and combinations thereof; a filter pore diameter of the base membrane is below 0.45 μm.

The loading amount of the carbon nano-material layer on the surfaces of the base membrane layers in the carbon nano-material composite membranes 16 is 8-32 g/m², the pure water flux of the carbon nano-material composite membranes 16 is 30-90 L·(m²·h·bar)$^{-1}$, the specific resistance is 1.0-2.0×10$^{18}$ m$^{-2}$, and the filtration area is not less than 0.1 m².

A water treatment method utilizing the above device comprises the following steps:

(1) closing the fourth valve 58, the fifth valve 60, the sixth valve 61 and the circulating water pump 53, and opening the first valve 35, the second valve 37, the second valve 45, the seventh valve 3, the dosing pump 43 and the pressure pump 33;

(2) storing the raw water to be treated in the raw water tank 31, stirring it by a stirrer to maintain a homogeneous state, and then transporting to the pressure pump 33 through the first pipeline 32, adjusting the first valve 35 to control the flow rate of the raw water, and controlling the flow rate of the raw water to be treated corresponds to a membrane flux of 0.5-5.0 L·min$^{-1}$·m$^{-2}$;

(3) storing the oxidant in the oxidant storage tank 41, covering the oxidant storage tank 41, stirring it by a stirrer to maintain a homogeneous state, transporting the oxidant to the dosing pump 43 through the third pipeline 42 and then through the fourth pipeline 44 to the first pipeline 32 to mix up with the raw water in the first pipeline 32 and run into the pressure pump 33, adjusting the rotation speed of the dosing pump 43 to control the dosage of the oxidant, and controlling the flow rate of the oxidant to be not greater than 5% of the flow rate of the raw water to be treated; when the oxidant is a persulfate solution, controlling the temperature of the oxidant to be lower than 30° C.; when the oxidant is an ozone solution, controlling the temperature of the oxidant to be 0-4° C.;

(4) transporting the mixture of the raw water and the oxidant through the second pipeline 34 to the water inlet pipe 21 of the plate-and-frame membrane module 1 after being pressurized by the pressure pump 33, when the oxidant is a persulfate solution, an initial molar concentration ratio of persulfate to organic micro-pollutants in the mixture is controlled to be (50-200):1; when the oxidant is an ozone solution, an initial mass concentration ratio of ozone to organic micro-pollutants in the mixture is controlled to be (10-50):1;

(5) evenly distributing the mixture from the water inlet pipe 21 to the internal cavities of the front partition plate 12, the middle partition plates 18 and the rear partition plate 19 through the first communicating pipe 26, and in the bottom-up flow process, evenly distributing it to the surfaces of the carbon nano-material layers after being guided by the flow guide screen plates 15, the mixture zigzags in the micro layer structure of the carbon nano-material composite membranes 16, and simultaneously undergoing catalytic oxidation and separation and retainment, which effectively removes organic micro-pollutants in water, after collecting the treated water by the orifice plates 17, converging it to the internal cavities 25 of the filter plates 13, and then running into the water outlet pipe 22 through the second communicating pipe 27, and transporting it to the clean water reservoir 2 by the water outlet pipe 22;

(6) closing the first valve 35, the second valve 37, the second valve 45, the seventh valve 3, the dosing pump 43 and the pressure pump 33 and opening the fourth valve 58, the fifth valve 60, the sixth valve 61 and the circulating water pump 53 when the reading of pressure gauge 4 is close to 5 bar, storing the ammonia with a mass concentration of 4%-10% and pH not lower than 10 stored in the ammonia stirring and sealed storage tank 51, transporting the ammonia through the fifth pipeline 52 to the circulating water pump 53, then through the sixth pipeline 54 to the heat exchanger 55 and heating, through the seventh pipeline 56 to the water inlet pipe 21, and then evenly distributing the ammonia to the cavities 25 of the front partition plate 12, the middle partition plates 18 and the rear partition plate 19 via the first communicating pipe 26 from the water inlet pipe 21, and in the bottom-up flow process, evenly distributing the ammonia to the surfaces of the carbon nano-material layers after being guided by the flow guide screen plates 15, which zigzags in the micro layer structure of the carbon nano-material composite membranes 16 to in-situ repair the carbon nano-material, collecting the flow by the orifice plates 17, converging it to the internal cavities 25 of the filter plates 13, and then running into the water outlet pipe 22 through the second communicating pipe 27, and transporting it to the ammonia stirring and sealed storage tank 51 by the eighth pipeline 57; wherein, controlling the flow rate of the ammonia corresponds to a membrane flux of 0.1-0.4 L·min$^{-1}$·m$^{-2}$, the thermal media used by the heat exchanger 55 is heat transfer oil, and the heat transfer oil is in countercurrent contact with the ammonia to ensure that the ammonia at the outlet of the heat exchanger 55 has a temperature of 120-150° C.; and stopping the in-situ regeneration when the reading of the pressure gauge is below 1.5 bar or after running for 4 to 8 hours.

The treatment device and treatment method in the present specific implementation is particularly suitable for the raw water to be treated with a concentration of organic micro-pollutants below 0.5 mg/L, the total organic carbon concentration less than 1 mg/L, no suspended matter, and pH 6-9.

Embodiment 1

The specific parameter settings of the foregoing treatment device used in this embodiment are as follows:

carbon nano-material composite membrane 16: the carbon nano-material loading amount was 16 g·m$^{-2}$, the mass ratio of rGO and MWCNT was 3:1, the pure water flux was about 39 L·(m²·h·bar)$^{-1}$, the specific resistance was preferably 1.8×10$^{18}$ m$^{-2}$, and the filtration area of a single membrane was 0.1 m²; rGO flakes had a diameter of 2-5 μm, a thickness of 0.8-1.2 nm, an atomic ratio of carbon to oxygen of 3.3:1, and a mono-layer rate of >95%; MWCNT had an inner diameter of 2-5 nm, an outer diameter of <8 nm, a length of 1-2 μm, and a specific surface area of >500 m²·g$^{-1}$; the base membrane used a nylon membrane with a diameter of 400 nm, and the filter pore diameter was preferably 0.22 μm;

the plate-and-frame membrane module 1: the number of the filter plates 13 was 6, the number of the middle partition plates 18 was 5, and a total filtration area was about 1.2 m$^2$;

raw water treated in the present embodiment: the concentration of sulfamethoxazole was 0.05 mg/L, the background total organic carbon concentration was about 0.3 mg/L, no suspended matter, and the pH was about 6.8;

oxidant: sodium persulfate aqueous solution;

regenerant: 4% ammonia aqueous solution.

The specific treatment steps comprise micro-pollutant removal and composite membrane function regeneration, specifically as follows:

(1) micro-pollutant removal: the raw water flow rate was about 0.6 L·min$^{-1}$, the corresponding membrane flux was about 0.5 L·min$^{-1}$·m$^{-2}$; the temperature of the sodium persulfate concentrated solution was controlled at 25° C., and the oxidant flow rate was controlled about 2% of the raw water flow rate, the initial molar concentration ratio of sodium persulfate to sulfamethoxazole was 100:1; and the initial reading of pressure gauge 4 was 1.7 bar. With the extension of the treatment time, the reading of the pressure gauge 4 gradually increased, reaching 4.6 bar after 72 h of treatment.

(2) composite membrane function regeneration: the circulation flow rate of ammonia was about 0.24 L·min$^{-1}$, and the corresponding membrane flux was 0.2 L·min$^{-1}$·m$^{-2}$; the temperature of the ammonia aqueous solution at the outlet of the heat exchanger 55 was about 122° C. The initial reading of pressure gauge 4 was 3.9 bar, then gradually decreased, and after running for 6 h, the reading of pressure gauge 4 stabilized at 1.1 bar, and the in-situ regeneration operation was stopped.

Figure 9:
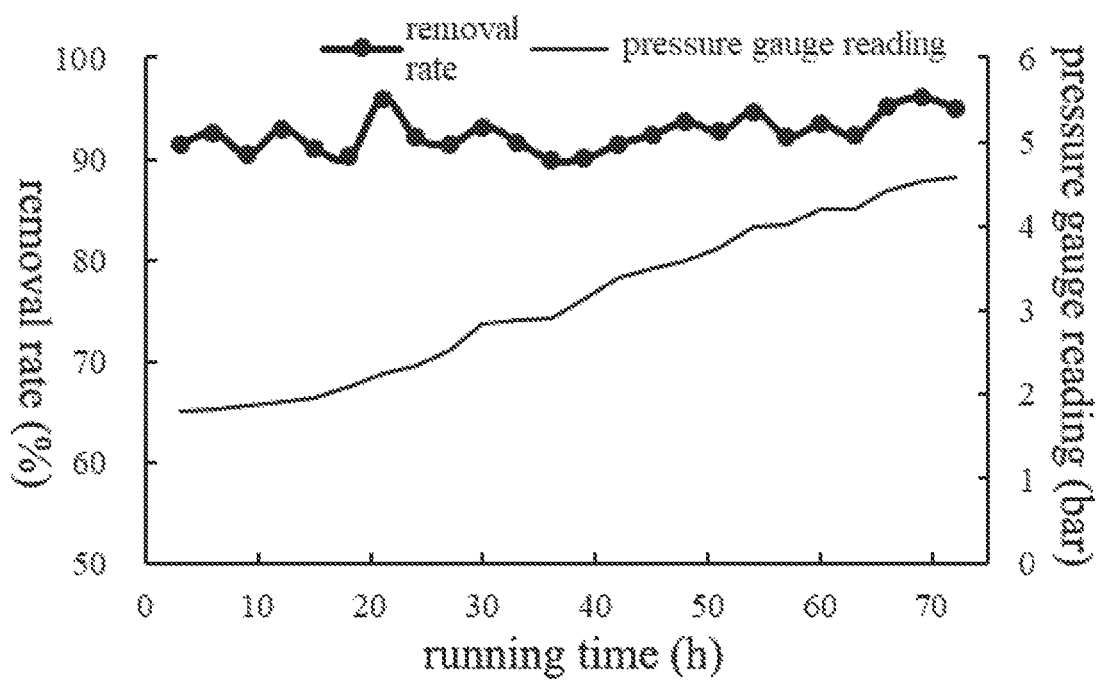
FIG. 9 is a diagram showing the relationship between the removal rate of low-concentration sulfamethoxazole and the single running time of the advanced water treatment device in Embodiment 1.
Figure 10:
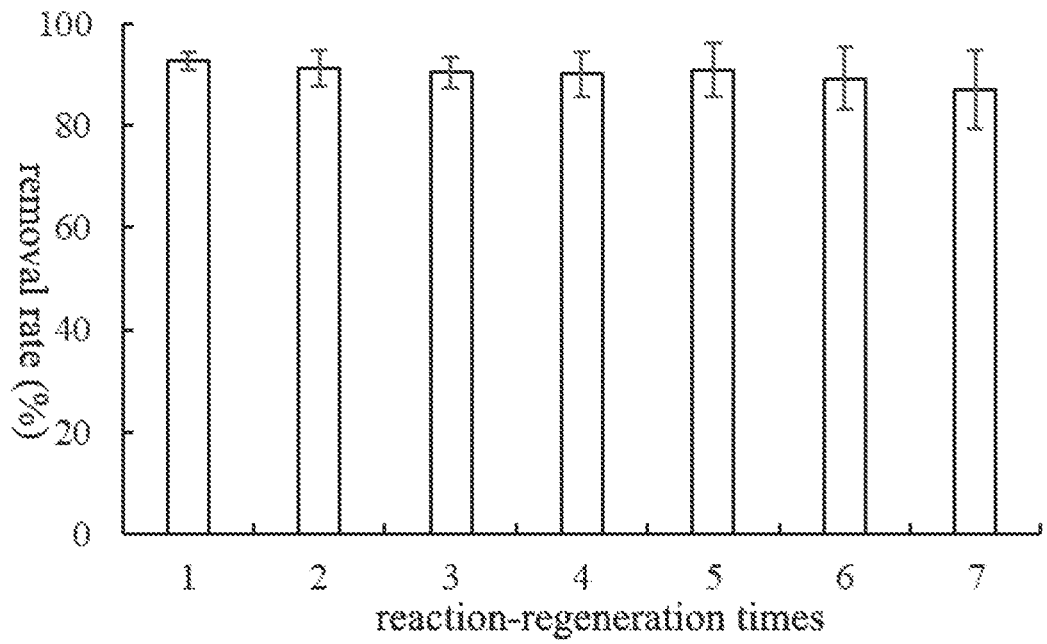
FIG. 10 is a diagram showing the relationship between the removal rate of low-concentration sulfamethoxazole and the regeneration times of the advanced water treatment device in Embodiment 1.
Figure 11:
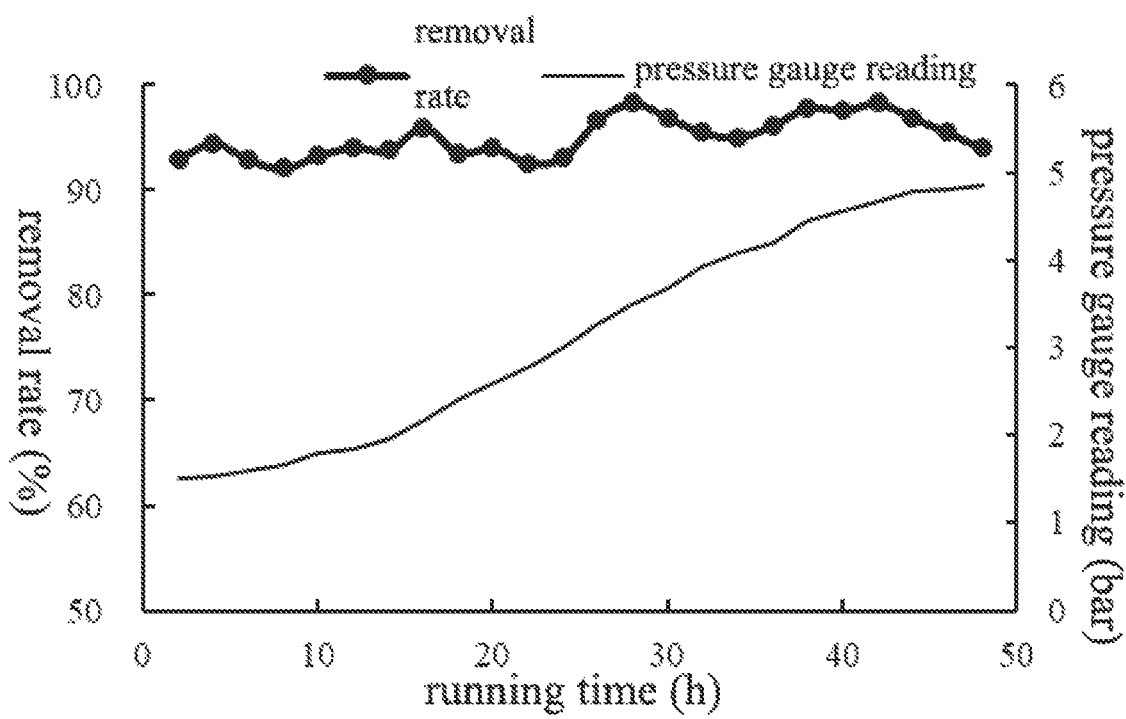
FIG. 11 is a diagram showing the relationship between the removal rate of low-concentration phenols and the single running time of the advanced water treatment device in Embodiment 2.
Figure 12:
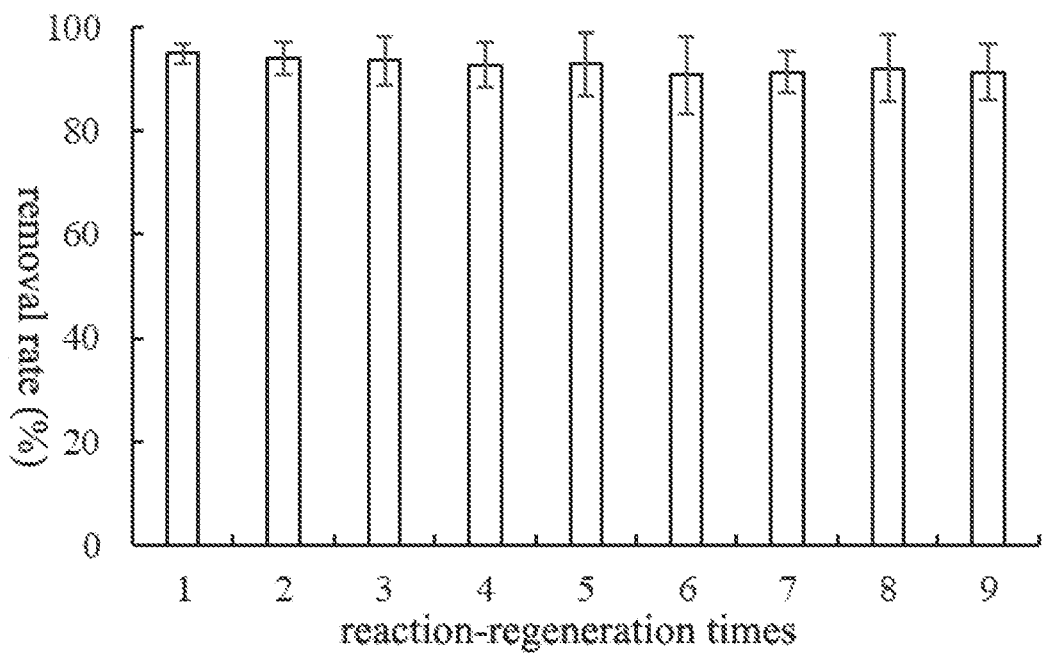
FIG. 12 is a diagram showing the relationship between the removal rate of low-concentration phenols and the regeneration times of the advanced water treatment device in Embodiment 2.

Using this embodiment, the treatment-regeneration was repeated 7 times, and the operation conditions are shown in FIGS. 9 and 10. The results of Embodiment 1 show that the removal effect of sulfamethoxazole is still very good after 7 times of treatment and regeneration.

Embodiment 2

The specific parameter settings of the foregoing treatment device used in this embodiment are as follows:

carbon nano-material composite membrane 16: the carbon nano-material loading amount was 32 g·m$^{-2}$, the mass ratio of rGO and MWCNT was 2:1, the pure water flux was about 52 L·(m$^2$·h·bar)$_{-1}$, the specific resistance was preferably 1.5×10$^{18}$ m$_{-2}$, and the filtration area of a single membrane was 0.1 m$^2$; rGO flakes had a diameter of 2-5 μm, a thickness of 0.8-1.2 nm, an atomic ratio of carbon to oxygen of 3.7:1, and a mono-layer rate of >95%; MWCNT had an inner diameter of 2-5 nm, an outer diameter of <8 nm, a length of 1-2 and a specific surface area of >500 m$^2$·g$^{-1}$; the base membrane used a PVDF membrane with a diameter of 400 nm, and the filter pore diameter was preferably 0.45 μm;

the plate-and-frame membrane module 1: the number of the filter plates 13 was 8, the number of the middle partition plates 18 was 7, and a total filtration area was about 1.6 m$^2$;

raw water treated in the present embodiment: the concentration of phenols was 0.03 mg/L, the background total organic carbon concentration was about 0.6 mg/L, no suspended matter, and the pH was about 7.4;

oxidant: ozone aqueous solution;

regenerant: 8% ammonia aqueous solution.

The specific treatment steps comprise micro-pollutant removal and composite membrane function regeneration, specifically as follows:

(1) micro-pollutant removal: the raw water flow rate was about 1.6 L·min$^{-1}$, the corresponding membrane flux was about 1.0 L·min$^{-1}$·m$^{-2}$; the temperature of the ozone concentrated solution was controlled at 0° C., and the oxidant flow rate was controlled about 5% of the raw water flow rate, the initial molar concentration ratio of ozone to phenols was 50:1; and the initial reading of pressure gauge 4 was 1.4 bar. With the extension of the treatment time, the reading of the pressure gauge 4 gradually increased, reaching 4.9 bar after 48 h of treatment.

The invention claimed is:

1. An advanced water treatment device, comprising:
a plate-and-frame membrane module having a water inlet pipe and a water outlet pipe, the late-and-frame membrane module comprising:
a thrust plate disposed at a first end of the plate-and-frame membrane module;
a pressing plate disposed at a second end of the plate-and-frame membrane module, the second end opposing the first end;
a front partition plate directly adjacent to the thrust plate, located between the first end and the second end;
a rear partition plate directly adjacent to the pressing plate, located between the first end and the second end;
a plurality of filter plates located between the front partition plate and the rear partition plate;
a plurality of middle partition plates, which are different than the plurality of filter plates, located between the front partition plate and the rear partition plate;
wherein, between the front partition plate and the rear partition plate, the plurality of middle partition plates are disposed between two adjacent filter plates so that each filter plate is directly adjacent to a middle partition plate;
wherein a flow guide screen plate and an orifice plate are disposed between each filter plate and middle partition plate arranged between the front partition plate and the rear partition plate;
wherein the water outlet pipe extends through an upper portion of the front partition plate, an upper portion of the plurality of filter plates, an upper portion of the plurality of middle partition plates, and an upper portion of the rear partition plate;
wherein the water inlet pipe extends through a bottom portion of the front partition plate, a bottom portion of the plurality of filter plates, a bottom portion of the plurality of middle partition plates, and a bottom portion of the rear partition plate;
a raw water delivery system communicating with the water inlet pipe of the plate-and-frame membrane module
a clear water reservoir communicating with the water outlet pipe of the plate-and-frame membrane module; and
an oxidant dosing system communicating with the water inlet pipe of the plate-and-frame membrane module or the raw water delivery system;
wherein the plate-and-frame membrane module further comprises one or more carbon nanomaterial composite membranes, the one or more carbon nanomaterial composite membranes comprise carbon nanomaterial layers and base membrane layers supporting the carbon nanomaterial layers which are sequentially disposed between the water inlet pipe and the water outlet pipe, and raw materials of the carbon nanomaterial layers comprise mono-layer reduced graphene oxide and multiwalled carbon nanotubes, a mass ratio of the reduced graphene oxide to the multiwalled carbon nanotubes in the carbon nanomaterial layer is (2-4):1;

wherein a loading amount of the carbon nanomaterial layers on surfaces of the base membrane layers in each of the one or more carbon nanomaterial composite membranes is 8-32 $g/m^2$, the loading amount being a mass of the carbon nanomaterial layer supported on a surface of a base membrane layer per unit area;

wherein the raw water delivery system is used to store raw water to be treated, in the raw water to be treated, a concentration of organic micro-pollutants is below 0.5 mg/L, a total organic carbon concentration is less than 1 mg/L, there is no suspended matter, and pH is 6-9;

wherein the oxidant dosing system is used to store oxidant;

wherein a mixed liquid of the raw water to be treated and the oxidant zigzags in a microlayer structure of the one or more carbon nanomaterial composite membranes, and at the same time, a catalytic oxidation and a separation and retainment happen, thus the organic micro-pollutants in the raw water to be treated are effectively removed.

2. The advanced water treatment device according to claim 1, wherein the flow guide screen plate is disposed between the water inlet pipe and the carbon nanomaterial layer, and a silica gel seal ring is disposed between the flow guide screen plate and the carbon nanomaterial layer.

3. The advanced water treatment device according to claim 2, wherein the orifice plate comprises a base plate, a plurality of flow guide trenches provided on the base plate, and a plurality of flow guide holes provided in the flow guide trenches.

4. The advanced water treatment device according to claim 2, wherein one flow guide screen plate, one silica gel seal ring, one carbon nanomaterial composite membrane and one orifice plate form a membrane separation assembly, and the plate-and-frame membrane module comprises a plurality of membrane separation assemblies arranged side by side.

5. The advanced water treatment device according to claim 4, wherein the front partition plate, the plurality of middle partition plates, the rear partition plate and the plurality of filter plates respectively have internal cavities, and a side of the front partition plate close to the plurality of filter plates and a side of the rear partition plate close to the plurality of filter plates are respectively provided with an opening communicating with the internal cavities, and both sides of the plurality of middle partition plates and both sides of the plurality of filter plates are provided with openings communicating with the internal cavities; the lower portions of the front partition plate, the plurality of middle partition plates and the rear partition plate respectively connect the internal cavities with the water inlet pipe via first communicating pipes; and the upper portions of the plurality of filter plates connect the internal cavities with the water outlet pipe via second communicating pipes.

6. The advanced water treatment device according to claim 5, wherein a cross-sectional area of the internal cavities is the same as the filtration area of each of the carbon nanomaterial composite membranes; dimensions of the front partition plate, the plurality of middle partition plates and the rear partition plate are the same, and a thickness of the plurality of filter plates is 1.2 to 1.5 times a thickness of the plurality of middle partition plates.

7. The advanced water treatment device according to claim 1, wherein the raw water delivery system comprises a raw water tank, a first pipeline communicating with the raw water tank, a pressure pump communicating with the first pipeline, a second pipeline respectively communicating with the pressure pump and the water inlet pipe, a first valve and a first flow meter arranged on the first pipeline, and a second valve arranged on the second pipeline; the oxidant dosing system comprises an oxidant storage tank, a third pipeline communicating with the oxidant storage tank, a dosing pump communicating with the third pipeline, a fourth pipeline respectively communicating with the dosing pump and the first pipeline, a third valve arranged on the third pipeline, and a second flow meter arranged on the fourth pipeline.

8. The advanced water treatment device according to claim 1, further comprising a pressure gauge arranged on the water inlet pipe.

9. The advanced water treatment device according to claim 1, wherein the advanced water treatment device further comprises a membrane function regeneration system, and the membrane function regeneration system comprises an ammonia stirring and sealed storage tank, a fifth pipeline communicating with the ammonia stirring and sealed storage tank, a circulating water pump communicating with the fifth pipeline, a sixth pipeline communicating with the circulating water pump, a heat exchanger communicating with the sixth pipeline, a seventh pipeline respectively communicating with the heat exchanger and the water inlet pipe, an eighth pipeline respectively communicating with the water outlet pipe and a bottom portion of the ammonia stirring and sealed storage tank, a fourth valve and a third flow meter arranged on the fifth pipeline, a fifth valve arranged on the seventh pipeline, and a sixth valve arranged on the eighth pipeline; and/or, the advanced water treatment device further comprises a seventh valve arranged on the water outlet pipe between the junction of the eighth pipeline and the water outlet pipe and the clean water reservoir.

* * * * *